United States Patent [19]

Gordon, Jr.

[11] 4,047,502
[45] Sept. 13, 1977

[54] HEAVY DUTY STANCHION

[76] Inventor: Melvin T. Gordon, Jr., 5107 Amberhill Drive, Greensboro, N.C. 27405

[21] Appl. No.: 689,201

[22] Filed: May 24, 1976

[51] Int. Cl.² .............................................. A01K 29/00
[52] U.S. Cl. .................................................. 119/29
[58] Field of Search ............. 119/1, 29; 211/86, 105.4

[56] References Cited

U.S. PATENT DOCUMENTS

| 2,637,555 | 5/1953 | Klaudt | 211/105.4 X |
| 3,479,991 | 11/1969 | Lichtenberger | 119/1 |
| 3,961,822 | 6/1976 | Daniel | 211/86 X |

Primary Examiner—Hugh R. Chamblee

[57] ABSTRACT

A collapsible, floor-to-ceiling stanchion with attached ledges is both decorative and functional in that it is of heavy duty construction, specifically designed to withstand various types of stress such as the weight of heavy objects placed on the ledges or transverse moving forces striking the stanchion sides. The stanchion may be easily adjusted to individual room ceiling heights and may be totally dismantled for moving or storage. End uses include home furnishing such as a plant/curio stand, or, when carpet-covered, serves as a cat exercise/play apparatus.

4 Claims, 3 Drawing Figures

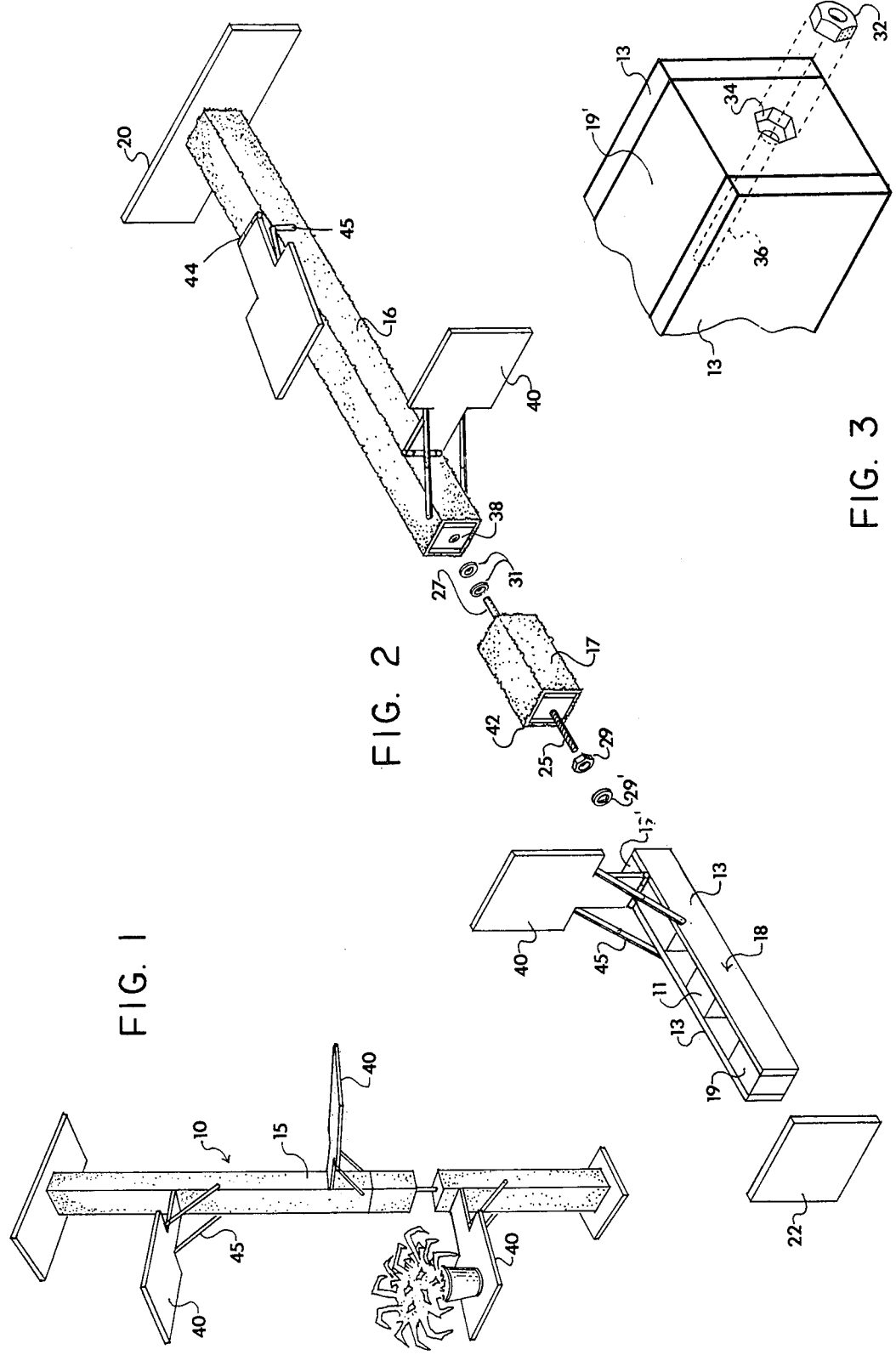

HEAVY DUTY STANCHION

BACKGROUND OF THE INVENTION

Various types of stanchions have been developed in the past for various uses including display stands and cat scratching or exercise equipment. Such stanchions include those illustrated and described in U.S. Pat. No. 3,479,990 to Crow for a cat tree; No. 3,479,991 to Lichtenberger for an animal climbing structure; No. 2,143,592 to Baldeck and No. 3,280,527 to Faust. Each of these patents discloses a vertical structure held upright between the floor ceiling by means of resilient axial pressure and including attached shelves or ledges on which cats may climb and play or curios may be placed. However, none of these known devices has been sufficiently durable to satisfactorily withstand the constant jumping and climbing of full-grown cats in the size range or 15 to 20 pounds or the weight of very heavy objects on the ledges. The shelving or perch structures have been known to break or collapse under the weight of a larger cat or art object. Further, the support of stanchions by resilient axial pressure (or ball and socket in the case of Lichtenberger), while satisfactory for vertically applied forces, is totally unsatisfactory for applied forces which include a horizontal component. Merely tightening the stanchion against the ceiling and floor is not the answer because of possible damage to the ceiling.

SUMMARY OF THE INVENTION

The present invention is directed to the solution of the above problems by providing a relatively heavy, sturdy structure that is strong enough to withstand transverse moving forces such as the playful antics of large domestic cats, the heavy weight of large articles, and which may be disassembled for portability while remaining attractive as an element of home furnishings. The floor-to-ceiling, collapsible stanchion serves as a heavy duty curio stand or as exercise equipment capable of accommodating domestic cats of the larger sizes, although it is quite suitable for use by kittens without modification. The pole-like structure includes three vertical segments topped by a relatively large, force absorbing top plate. The segments are releasably joined together by axial members to more rigidly form the upright body of the apparatus. Horizontally extending planar ledges are foldably attached to the upright body for use in displaying curios or as cat perches. In setting up the segmented body, a positive, level type force, rather than resilient spring force is applied against ceiling and floor to prevent inadvertent collapse when the structure is subjected to large transverse forces.

Unique features of the apparatus include the structural components specifically selected for their durability and resistance to stress; particularly stress resulting from the horizontal force component of a moving body engaging the vertical post or one of the ledges. The sectional post is constructed of wood, either solid or framed, or light-weight but sturdy materials and the ledges are attached at selected intervals horizontally to the vertical post by means of relatively strong, locking, butt hinges that may be folded flat for moving or shipping.

To assemble and install the apparatus, the three segments are secured together by means of a rod mounted to extend axially beyond the ends of the intermediate pivot member or middle segment into female receptacles in the upper and lower segments. One of the aforementioned rods is threaded and received within a correspondingly threaded nut or female fastener. To adjust for variations in ceiling height, the middle segment is rotated clockwise or counter-clockwise to expand or retract the effective length of the stanchion.

The stanchion may, if desired for the purposes of color coordination or for providing traction in the case of animal amusement devices, include carpeting to cover the vertical post. Another possibility for finish is staining exposed wood to coordinate with the room scheme.

It is therefore a primary object of the present invention to provide a light-weight but heavy duty, collapsible stanchion including hingedly attached ledges suitable for a variety of uses.

It is also an object of the present invention to provide a stanchion which will be completely collapsible into lengths of relatively short dimensions.

A further object of the present invention is to provide a stanchion which is adjustable to various floor-to-ceiling room heights.

Another object of the present invention is to provide a stanchion that may be used as an exercise apparatus for domestic cats which will withstand the physical stress and force resulting from the exercise and play antics of animals from the sizes of kittens up to a weight of approximately 20 pounds.

A still further object of the present invention is the provision of a stanchion and ledges strong enough to support heavy art objects or curios.

Other objects and uses of the present invention will become apparent to those skilled in the art as the following description is studied in conjunction with the accompanying drawings, in which:

FIG. 1 is a perspective view, with the top and bottom removed, of the present invention according to a preferred embodiment;

FIG. 2 is an exploded perspective view of the construction details of the segmented vertical post according to the present invention with one of the segments having the covering removed; and FIG. 3 is a perspective view of the upper end of the lower segment, with most of the remainder of the segment broken away.

DETAILED DESCRIPTION OF A PREFERRED EMBODIMENT

In FIGS. 1 and 2, there is depicted the stanchion 10 as it would be positioned within a room. A vertical segmented post member 15 extends from the floor-to-ceiling of a room, a relatively large top plate 20 secured to the upper end of post 15 engages and bears against the room ceiling, a base plate 22 is similarly secured to the lower end for engagement with the room floor, and multiple horizontal ledges 40 are hingedly attached at spaced intervals along the vertical post 15.

The stanchion 10 is more resistant to strong and moving forces than known prior art because of the materials from which it is constructed and the means for securing the segments together and between the room floor and ceiling. Construction materials may be selected from various woods, metals or plastics with desirable qualities being strength and lightness of weight. This is discussed in more detail below.

Also discussed below is the fact that it is held in place by a lever-type force which applies positive, constantly applied, non-resilient force through the respective ends firmly against the room floor and ceiling. This force may be maximized without damaged to the ceiling surface because the ceiling plate is so dimensioned as to span the distance between ceiling beams, thereby distributing the force evenly over larger areas to prevent rupture of the ceiling structure.

The detailed inner construction of the vertical post 15 is illustrated in FIG. 2. Because most of the prior art teaches the use of spring-related devices or resiliently applied forces to hold posts of this type in place between a floor and ceiling, and because that type of structure is not sturdy enough to withstand strong or heavy forces, especially those having considerable horizontal components, the present invention was designed to be securely held in place by the application of a positive, lever type force, which is so distributed against the room ceiling and floor as to maximize pressure without surface damage. To accomplish this, the vertical post 15 is formed in three separable segments: top section 16, middle or pivot section 17, and bottom section 18.

Each of the segments 16,17,18 may be constructed from a solid piece of wood, such as lengths of 4×4 wood stock, or preferably, as described below, may be formed as a hollow core with solid wood end inserts for mounting hardware, which construction substantially decreases overall weight. It should also be noted that other materials such as some metals and plastics could be used.

As mentioned hereinabove, one of the unique features of the present invention resides in the maximization of force exerted against floor and ceiling without damage. This is facilitated by the relative large size of upper plate 20 which is of such length (approximately 26 inches) as to span two adjacent ceiling beams. Therefore the force is taken up by the beams, rather than by the relatively weaker sheetrock material which conventionally forms ceilings in homes constructed today. The additional size of the upper plate also increases the frictional force between stanchion and ceiling, better resisting the tendency to collapse as a result of lateral forces.

As illustrated in FIG. 2 at least the top and bottom segments 16 and 18, and the middle or pivot section 17 if desired, are formed with outer walls 13 extending the length of the segment 18. The shorter end inserts 19,19' are secured between the opposite ends of outer walls 13 as illustrated in the lower segment 18 in FIG. 2. Further, a central brace 11 may be added on longer segments to increase the overall strength of such segents. Inserts 19',20' also act as mounting means for the hardware which interconnects the upper and lower segments 16,18 with pivot section 17.

Pivot section 17 preferably constructed either from a solid piece of wood or from a pair of outer walls 13 with a single insert 19 therebetween corresponding to the lengths of segment 17. A threaded rod 25 is secured within the lower end of the pivot section 17 and extends downwardly therefrom for insertion into a threaded female member 32 secured within a seat 34 the center portion of insert 19'. An axially extending bore 36 is formed in the upper end of insert 19' to communicate with seat 34 and provide a clearance passageway into which rod 25 extends after insertion through fastener 32. A second nut 29 and lock washer 29'may be provided on shaft 25 for additional tightening by wrench after the stanchion is set up and hand tightened as described hereinbelow.

A second rod 27, which is not necessarily threaded at the free end, is secured in and protrudes from the upper end of the pivot section 17. Rod 27 is received in a passageway or bore 38 in the lower end of upper segment 16 in a similar manner to the way rod 25 is received within clearance passageway 36 in lower segment 18. One or more flat washers 31 separate the adjacent end surfaces of segments 16 and 17 and allow easy relative movement therebetween. During erection of the apparatus, male rods 25 and 27 are placed into the upper and lower ends of the segments 18,16 respectively and threaded rod 25 is adjusted vertically to expand the stanchion into engagement with the ceiling by rotating pivot section 17 backward or forward. Subsequently, the system is locked together to prevent inadvertent loosening and is somewhat reinforced by tightening adjusting nut 29 against lock washer 29' in a well known manner.

It should be pointed out that the illustrated positioning and relation or rods 25,27 with respect to bores 36,38 is representative only. It makes little difference which segment carries the threaded rod 25, rod 27 and which segment has bores 36,38 or nut 32.

If the end use of stanchion 10 is to be as a cat exercise post, segments 16,17,18 are preferably wrapped overall with carpeting or similar material 42. The carpeting may be attached by any known method such as tacks, staples or glue. The exposed surface of the top and base plates 22,22' may be either wood stained or carpet covered and are secured to the respective ends of the vertical post 15 by screws, adhesive, or other means. The surfaces of these plates which abut the floor or ceiling should be perfectly flat, and if desired for further protection should be carpeted or covered with another protective covering to prevent scarring or other damage to surfaces of floor and ceiling. If used as a curio stand, the segments 16,17,18 may remain uncovered, be wood stained, covered with plexiglas, or painted to blend with other home furnishings. Where uncovered, the hardware is preferably of any decorative type desired.

Ledges or perches 40 are hingedly attached to the sides of vertical post 15 at desired selected intervals. They may be of any desired size or shape which will accomodate an animal or large object. The unique feature of these ledges is in the support mechanism that locks in place sufficiently to prevent the ledge collapsing under the weight or the sudden striking force generated by larger cats jumping from ledge to ledge. Such supporting device 45 shown in FIG. 1 includes a conventional hinge 44 and a hinged table leg lock 45 of the type that is used on folding tables so that the legs may be folded up underneath the table. However, this hinged locking device 45 is modified by increasing the depth of the notches into which the locking pin slips when opened to lessen the possibility of the locking pin slipping out of position when the ledge is subjected to a sudden and/or substantial force.

The ledges 40 are generally rectangular in shape and of a dimension suitable for holding a large object or cat. They may be stained with a wood finish and/or may be carpet covered as is the vertical post 15. Each ledge 40 is positioned at desired intervals around vertical post 15 and, by means of the hinged supports 45, can be folded downward flat against the vertical post for moving or storage.

The foregoing description should be understood as being for illustration only and in no way limiting; the scope of the invention be defined only by the following claims:

That which is claimed is:

1. A collapsible, floor-to-ceiling stanchion comprising:
   a. at least three segments including an upper segment having a top plate attached to the upper end thereof, a lower segment having a base plate attached to the lower end thereof, and at least one intermediate pivot section;
   b. said pivot section being the shorter of said segments, with the walls of said three segments being substantially coplanar;
   c. means for separably assembling said three segments in longitudinally aligned relationship with each segment being axially pivotal with relation to the adjacent segments, said assembly means including at least one threaded rod extending between said pivot section and one of the other two segments, said rod being secured within an end wall of one section and the adjoining end wall of the adjacent section having a threaded receiving means therein for receiving said threaded rod in assembled relationship;
   d. said top plate having a length dimension of such magnitude as to extend across two adjacent beams of said ceiling when installed;
   e. a plurality of platforms and a hinge structure for pivotally securing said platforms to the side walls of at least one of said upper and lower segments, said platforms and hinge structure so constructed as to support weights of at least 20 pounds,
   f. each of said segments being covered with a traction imparting surface therearound;
   g. whereby, upon assembly, rotation of said pivot section changes the effective longitudinal dimension of said stanchion without the use of resilient force, and the large surface area of said top plate permits the axially applied force to be maximized to resist laterally applied forces without ceiling damage.

2. The stanchion according to claim 1 wherein said segments comprise a hollow core construction including two side walls of a relatively thin material extendng the length of said segment on opposite sides thereof and a relatively thick insert connecting each end portin of said side walls, at least one of said inserts including a axially extending passageway therein providing clearance for said rod.

3. The stanchion according to claim 1 wherein said threaded receiving means includes a nut and a concave seat formed in said end of a size and shape approximately the same as said nut, said nut being secured in said seat for adjustably receiving the threaded rod extending therein from said adjacent section.

4. The stanchion according to claim 1 wherein said platforms and the hinge structure therefore are so arranged as to support weights of at least 20 pounds.

* * * * *